US012771039B2

(12) United States Patent
Sippel et al.

(10) Patent No.: US 12,771,039 B2
(45) Date of Patent: Oct. 20, 2026

(54) ANTENNA STRUCTURE

(71) Applicant: FRIEDRICH-ALEXANDER-UNIVERSITÄT ERLANGEN-NÜRNBERG, Erlangen (DE)

(72) Inventors: Mark Sippel, Fürth (DE); Gerald Gold, Erlangen (DE); Andreas Hofmann, Erlangen (DE); Konstantin Lomakin, Erlangen (DE)

(73) Assignee: FRIEDRICH-ALEXANDER-UNIVERSITÄT ERLANGEN-NÜRNBERG, Erlangen (DE)

( * ) Notice: Subject to any disclaimer, the term of this patent is extended or adjusted under 35 U.S.C. 154(b) by 30 days.

(21) Appl. No.: 18/869,197

(22) PCT Filed: May 23, 2023

(86) PCT No.: PCT/EP2023/063804
§ 371 (c)(1),
(2) Date: Nov. 25, 2024

(87) PCT Pub. No.: WO2023/227612
PCT Pub. Date: Nov. 30, 2023

(65) Prior Publication Data

US 2025/0357674 A1 Nov. 20, 2025

(30) Foreign Application Priority Data

May 25, 2022 (DE) ..................... 10 2022 113 327.3

(51) Int. Cl.
*H01Q 13/10* (2006.01)
*H01Q 21/00* (2006.01)

(52) U.S. Cl.
CPC .................................. *H01Q 13/10* (2013.01)

(58) Field of Classification Search
CPC ........ H01Q 13/00; H01Q 13/10; H01Q 13/20; H01Q 13/28; H01Q 19/00; H01Q 21/00;
(Continued)

(56) References Cited

U.S. PATENT DOCUMENTS

| | | | |
|---|---|---|---|
| 2,993,205 | A | 7/1961 | Cooper |
| 3,594,806 | A | 7/1971 | Black et al. |

(Continued)

FOREIGN PATENT DOCUMENTS

| | | | |
|---|---|---|---|
| WO | 0143228 | A1 | 6/2001 |
| WO | 2021165201 | A1 | 8/2021 |
| WO | 2021241305 | A1 | 12/2021 |

OTHER PUBLICATIONS

Zhao, K. et al., "3D-Printed Frequency Scanning Slotted Waveguide Array with Wide Band Power Divider," Proceedings of the 2019 United States National Committee of URSI National Radio Science Meeting (USNC-URSI NRSM), Jan. 9, 2019, Boulder, Colorado, 2 pages.

(Continued)

*Primary Examiner* — Tho G Phan
(74) *Attorney, Agent, or Firm* — McCoy Russell LLP

(57) ABSTRACT

The present invention relates to an antenna structure comprising a waveguide, with the waveguide comprising a guide element for guiding waves and with a termination structure protruding away from the guide element being provided adjacent to the latter.

27 Claims, 8 Drawing Sheets

(58) Field of Classification Search
CPC ........... H01Q 21/0043; H01Q 21/0068; H01Q 21/0087; H01Q 25/00; H01Q 25/005
See application file for complete search history.

(56) References Cited

U.S. PATENT DOCUMENTS

| | | | | |
|---|---|---|---|---|
| 3,906,502 | A | 9/1975 | Connolly | |
| 3,949,405 | A | 4/1976 | Roquencourt | |
| 4,618,865 | A | 10/1986 | Lamensdorf et al. | |
| 5,541,612 | A | 7/1996 | Josefsson | |
| 6,259,415 | B1 * | 7/2001 | Kumpfbeck | H01Q 3/26 343/765 |
| 7,667,660 | B2 * | 2/2010 | Manasson | H01Q 13/28 343/781 R |
| 8,098,207 | B1 | 1/2012 | Herting et al. | |
| 10,256,517 | B2 * | 4/2019 | Poulson | H01Q 13/10 |
| 11,367,948 | B2 * | 6/2022 | Jordan | H01Q 1/422 |
| 11,444,387 | B2 * | 9/2022 | Achour | H01Q 13/28 |
| 12,542,372 | B2 * | 2/2026 | Bencivenni | H01Q 21/005 |
| 2016/0028165 | A1 | 1/2016 | Chen et al. | |
| 2020/0161738 | A1 | 5/2020 | de Rijk et al. | |
| 2023/0099058 | A1 | 3/2023 | Ikegami et al. | |

OTHER PUBLICATIONS

ISA European Patent Office, International Search Report Issued in Application No. PCT/EP2023/063804, Oct. 26, 2023, WIPO, 10 pages.

* cited by examiner

ANTENNA STRUCTURE

CROSS REFERENCE TO RELATED APPLICATIONS

The present application is a U.S. National Phase of International Application No. PCT/EP2023/063804 entitled "ANTENNA STRUCTURE," and filed on May 23, 2023. International Application No. PCT/EP2023/063804 claims priority to German Patent Application No. 10 2022 113 327.3 filed on May 25, 2022. The entire contents of each of the above-listed applications are hereby incorporated by reference for all purposes.

TECHNICAL FIELD

The present invention relates to an antenna structure, in particular for use in the high-frequency range, comprising a waveguide, wherein the waveguide comprises a guide element for guiding waves.

BACKGROUND AND SUMMARY

Such an antenna structure is used, for example, to guide and/or emit electromagnetic waves. Electromagnetic waves, in particular high-frequency signals, can propagate either in a space or in waveguides. Such waveguides provide conductive structures that encompass a spatial area and thus form a spatial path or channel to guide the electromagnetic waves or high-frequency signals therein or to manipulate them in space or frequency range or to emit them into it.

In many radar sensor applications, an "all-round view" of the antenna structure is a great advantage. Achieving this technically generally proves to be rather difficult.

FIG. 14 shows a cross-sectional view of a conventional waveguide slot antenna comprising a hollow waveguide 10 having one or more slots S on its upper wall. The main radiation area of the waveguide slot antenna 10 is labelled A. As can be seen from the figure, not the entire space around the hollow waveguide is covered or supplied, but only a partial circle shown here schematically. In the area not covered by the partial circle, e.g. next to and below the antenna, it is "blind".

To solve this problem, it would be conceivable to arrange another hollow waveguide slot antenna below the hollow waveguide slot antenna shown, which is slotted at the bottom. From a conventional point of view, it would therefore be conceivable to divide the space into several sectors, which are illuminated independently of each other or partly overlapping by several antennas.

Due to the spatial arrangement of the elements (array structure) and the spatial distance of the hollow waveguide slot antenna (usually more than lambda ½), this concept is associated with a very irregular gain curve.

Other solutions use slot antennas on circular hollow waveguides, for example, which illuminate the space from all sides. However, the integration of several such antennas for a MIMO radar system proves to be difficult due to the design, as the antennas are always in each other's way, as all sides of the circular hollow waveguide have to be slotted.

The object of the present invention is thus to further develop an antenna structure of the type mentioned above in such a way that uniform omnidirectional coverage of the space or omnidirectional radiation into the space is possible.

This object is achieved by an antenna structure with the features of claim 1. It is then provided that a termination structure protruding away from the guide element, i.e.

projecting, is provided adjacent to the guide element, e.g. adjacent to the hollow waveguide slot antenna. This can, for example, be shaped like a wing or in another way.

Surprisingly, it has been shown that such a structure produces a very uniform omnidirectional coverage or radiation area. The termination structure influences the emitted or received electromagnetic waves in such a way that a larger area is covered compared to the area shown in FIG. 14, so that blind spots can be reduced or, depending on the arrangement of the waveguide(s) or the emitting slots etc. and the termination structures, avoided altogether.

The guide element can be a dielectric waveguide, preferably having one or more electrically conductive strips (dielectric antenna: conductor and non-conductor are interchanged here).

It is particularly preferred if the guide element is a hollow waveguide comprising a guide channel, the inner surfaces of which are electrically conductive at least in some areas, wherein the guide channel has a first wall having one or more perforations. A preferred embodiment thus consists of a hollow waveguide provided with radiating slots on at least one side, at least one non-radiating side of which is terminated with a termination structure, i.e. "surface termination structure", primarily with a triangular cross-section.

The guide element is preferably elongated. It can be straight or curved. This also applies to the termination structure.

The guide element can have a longitudinal axis, wherein the termination structure extends in the direction of the longitudinal axis and preferably parallel to the longitudinal axis of the guide element.

The termination structure can have a different cross-sectional shape than the guide element. For example, it is conceivable that the guide element, e.g. the hollow waveguide has a rectangular cross-section and the termination structure has a triangular or round cross-section.

It is conceivable that the termination structure is designed as a compact body, i.e. a body without a cavity, or as a hollow body.

In one embodiment, the termination structure has a polygonal, preferably triangular, or round cross-section. For example, a semi-circular, triangular, polygonal, etc., structure can be considered.

In another embodiment, the guide channel has a second wall, wherein the second wall is a non-radiating side of the hollow waveguide and wherein the termination structure extends from the second wall.

The terms "perforation", "slot", etc. can be used in the context of the present for such openings that improve the accessibility of the process media, such as ink to the coating. These are non-radiating openings. The walls with such openings are also referred to as non-radiating walls or non-radiating sides, etc.

The terms "perforation", "slots", etc. also include wave-radiating openings. These do not intersect the current of the current density distribution on the inner walls of the hollow waveguide perpendicular to its direction of flow. In the context of the present disclosure, these are also referred to as radiating perforations, radiating slots, etc. The walls with such openings are also referred to as radiating walls or radiating sides, etc.

In detail, this is achieved, among other things, by the fact that these non-radiating openings are significantly smaller than half a wavelength and are orientated along the flow direction of the current. For example, on the narrow sides "from top to bottom".

The non-radiating openings are primarily very small in shape (small rectangular apertures), wherein the term “small” refers to small compared to the wavelength: in particular, smaller than a ¼ of the wavelength.

It can further be provided that the guide channel has a third wall, which has no perforations, one perforation or several perforations, wherein the third wall is preferably arranged opposite the first wall. The third wall can therefore also be a radiating wall, for example.

Furthermore, the guide element can have a fourth wall, which is adjoined by a further termination structure, wherein it is preferably provided that the fourth wall is arranged opposite the second wall.

Preferably, this fourth wall is a non-radiating side of the hollow waveguide.

The termination structure preferably extends over more than half the length of the guide element, preferably over more than ¾ of the length of the guide element and particularly preferably over the entire length of the guide element.

It is particularly advantageous if the termination structure is located in at least one area where the guide element has radiating perforations in the wall thereof, but preferably over the area of maximum radiation of the guide element or even over the entire radiating area of the guide element, wherein the radiating area of the guide element is characterized in that there are radiating perforations in at least one of the walls of the guide element in this area.

The termination structure can have a flat side that lies against one side of the guide element, wherein it is preferably provided that the two adjacent sides have the same height and/or weight.

It is also conceivable that the termination structure has a side, preferably an edge, facing away from the side of the guide element from which the termination structure extends. It is conceivable, for example, that the termination structure tapers away from the guide element, preferably to a point.

Preferably, the termination structure is a three-sided prism.

The termination structure can be formed in one piece with the hollow waveguide. It is also conceivable that the termination structure and the hollow waveguide consist of separate parts that are connected.

Furthermore, it can be provided that the side of the termination structure facing away from the waveguide, preferably the edge, is straight or corrugated or has one or more indentations, preferably has a serrated structure. This edge structure can have the termination structure over its entire length or only in a partial area thereof. In its longitudinal orientation, the termination structure can be serrated or corrugated along the edge, for example.

The antenna structure can have exactly one waveguide or several waveguides arranged next to and/or on top of each other. The antenna structure can thus have an array of waveguides.

Pairs of hollow waveguides slotted on one side are therefore conceivable, for example, which are arranged “back-to-back” so that one of the hollow waveguides radiates upwards, etc. and the other waveguide radiates in the opposite direction. Both hollow waveguides can be fed via a power divider, which has the advantage that different radiation characteristics can be obtained at the front and rear or on the opposite sides of the antenna structure.

It is conceivable that each of the waveguides, in particular the hollow waveguide, is provided with one or more termination structures. It is also conceivable that several hollow waveguides have a common termination structure.

In another embodiment, the guide channel is filled with air or with a dielectric, in particular with ceramic.

The waveguide can be a hollow waveguide or an antenna, in particular a horn antenna, or a filter or a resonator or a coupler or any other passive high-frequency component. The antenna structure may have one or more of the aforementioned components, which are preferably realized in a common component.

The guide element can be terminated at one end, for example by a short circuit or by an open circuit (so that a standing wave can be generated, which is a resonant antenna).

Preferably, the antenna structure is a radar sensor system or a component thereof.

The antenna structure can be flat or conform to a curved surface shape.

It is conceivable that the antenna structure has slots or other perforations as radiating elements on one or two or more than two sides, preferably on two opposite sides, such as at the top and/or bottom.

The cross-section of the guide element can be such that its height is preferably less than half its width.

The cross-section of the guide element can be rectangular, polygonal, round, rounded or elliptical or another cross-section.

One or more pairs of hollow waveguides slotted on one side, with their backs against each other, can be provided as well as a power divider for feeding the hollow waveguides.

The present invention also relates to a method for producing an antenna structure according to any one of the claims 1 to 24, wherein the guide element is manufactured partially or completely by means of additive methods, in particular 3D printing, SLS printing, metal printing, SLA 3D printing, machining or plastic injection molding.

The antenna structure and/or its waveguide can be manufactured monolithically or from several parts.

In a further embodiment of the invention, the method comprises immersing the waveguide one or more times in an immersion bath containing a dispersion, in particular an ultrasonic bath, wherein the dispersion has metal-containing particles, in particular gold and/or silver and/or copper particles.

It can also be provided that one or more slots penetrating the walls of the base body are made in the walls of the base body forming the inner surfaces of the base body prior to coating in order to promote the circulation of the dispersion in the cavity or in the area of the inner surfaces of the hollow waveguide.

High-frequency components according to the present invention can have 3D-printed or injection-molded plastic base bodies, which form the base body of the waveguide. These must be provided with a conductive coating to ensure that they function properly later on.

This includes electroplating or electroless plating with metals as well as chemical plating, in which a chemical reaction occurs between the reagent liquid and the surface of the body to be plated.

However, the method known from DE 10 2020 104 038.5 is particularly advantageous. Reference is hereby made in full to the disclosure of this patent application. The necessary electrically conductive coating of the base body is achieved by wetting at least a part, preferably the entire surface of the base body of the hollow waveguide with an electrically conductive dispersion containing microparticles and/or nanoparticles. The dispersion can be an ink with microparticles or nanoparticles. Conceivable nanoparticles are aluminum, silver, gold or copper particles or a mixture thereof. The dispersion or ink is matched to the surface energy of the base body material used, e.g. plastic, so that sufficient wetting of the surface is favored.

After evaporation/vaporization of the solvent/water, the surface of the base body is wetted with the ink material and a conductive coating is formed by optional post-treatment, preferably by the effect of heat, e.g. by sintering. This method is therefore a physical wetting process in which a conductive coating is formed by post-treatment.

At this point it is pointed out that the terms "a" and "one" do not necessarily refer to exactly one of the elements, although this is a possible embodiment, but can also denote a plurality of the elements. Similarly, the use of the plural also includes the presence of the element in question in the singular and, conversely, the singular also includes several of the elements in question.

It is further noted that any feature of this disclosure may be combined with any other feature of this disclosure.

Further details and advantages of the invention are explained in more detail with reference to an exemplary embodiment shown in the drawing.

DETAILED DESCRIPTION

Figure 1:
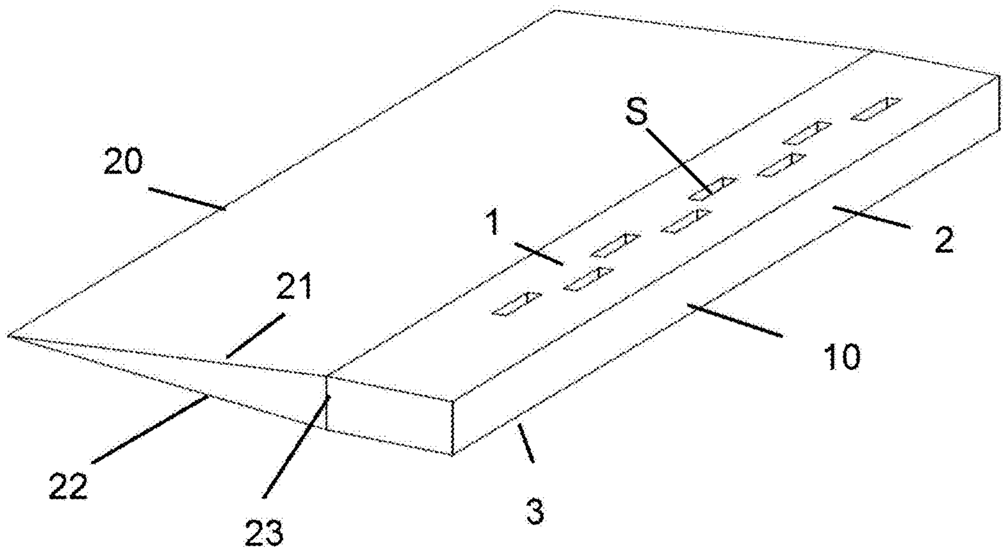
FIG. 1: shows a perspective view of a hollow waveguide slot antenna structure with a hollow waveguide with a termination structure arranged on one side.

In the figures, identical or functionally identical elements are provided with identical reference numerals.

Figure 2:
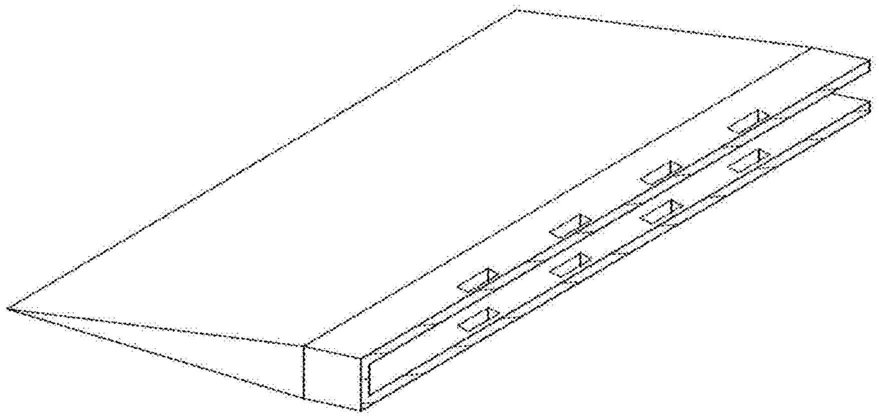
FIG. 2: shows a longitudinal sectional view of the arrangement according to FIG. 1, FIG. 3: shows a cross-sectional view of the arrangement according to FIG. 1, FIG. 4: shows a perspective view of a waveguide system having three monolithic hollow waveguides arranged next to each other with a termination structure on both sides.

FIG. 1 shows a hollow waveguide with the reference numeral 10, which (as can be seen in FIG. 2) has a first wall 1 and a third wall 3, which are each provided with slots S. Both the walls 1, 3 are thus radiating sides of the hollow waveguide 10.

The side walls of the hollow waveguide 10 are perpendicular to the walls 1, 3, resulting in a cross-sectionally rectangular profile of the hollow waveguide 10. The side walls 2, 4 are closed, i.e. do not have any radiating slots. However, they can also have non-radiating slots for processing.

These sides of the hollow waveguide are thus non-radiating. Of the side walls, only the side wall 2 is visible in FIG. 1.

A termination structure 20 adjoins the side wall 4 of the hollow waveguide 10 opposite the side wall 2. The termination structure 20 is triangular in cross-section, wherein the sides 21, 22 of the triangle are much longer than its base 23, resulting in a pointed triangle. As shown in FIG. 1, the tip S points away from the hollow waveguide 10.

The length of the base 23 corresponds to the height of the hollow waveguide 10, such that the termination structure does not protrude above or below the hollow waveguide.

The triangular angle of the tip is preferably $<45°$, particularly preferably $<20°$.

The triangle is preferably isosceles.

Figure 3:
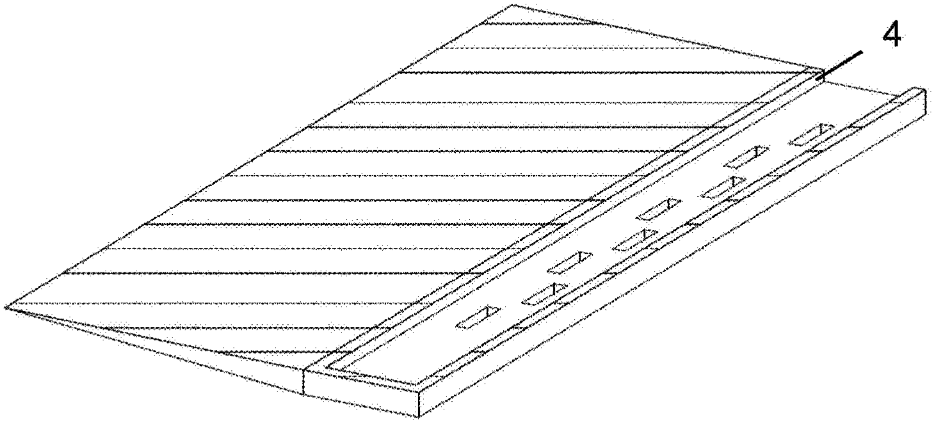

FIG. 3 also shows that the termination structure is compact, i.e. not hollow.

The hollow waveguide 10 and the terminal structure 20 are in two parts, i.e. do not consist of one and the same part.

Figure 4:
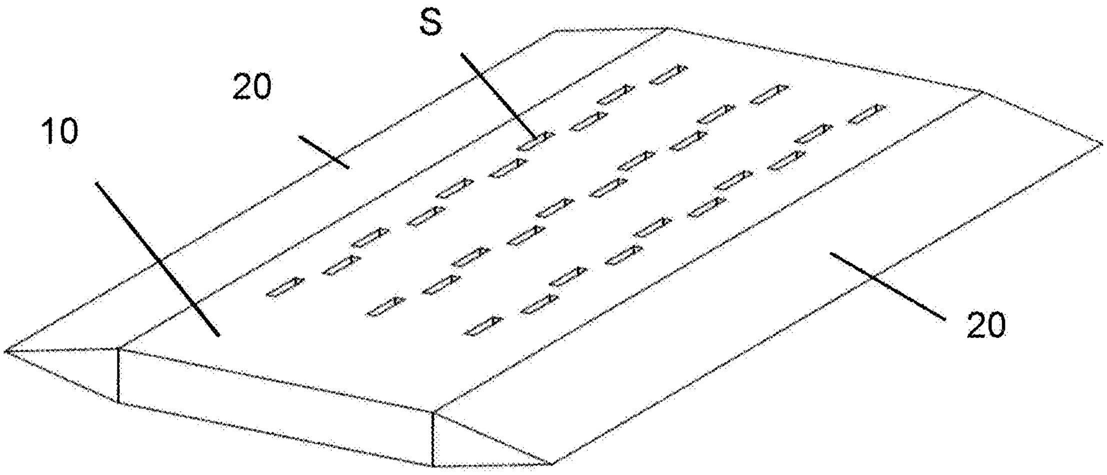
Figure 5:
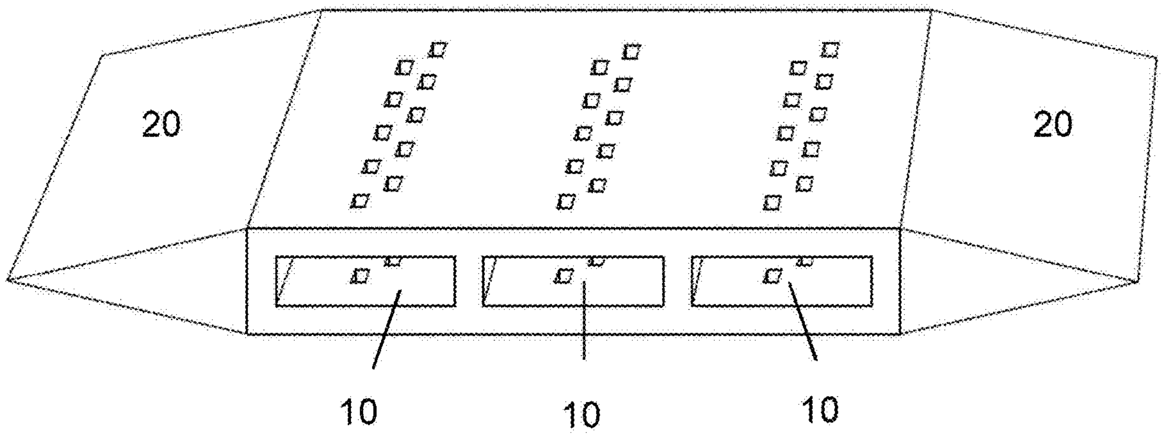
FIG. 5: shows a longitudinal sectional view of the arrangement according to FIG. 4, FIG. 6: shows a cross-sectional view of the arrangement according to FIG. 4, FIG. 7: shows a perspective view of a hollow waveguide slot antenna structure with a hollow waveguide with a termination structure arranged on both sides.
Figure 6:
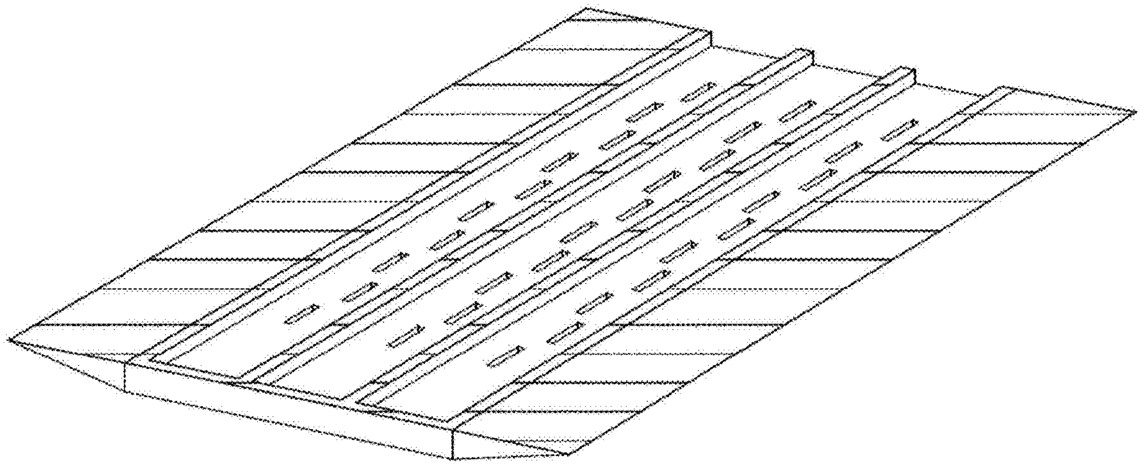

FIG. 4 shows an exemplary embodiment in which three hollow waveguides 10 are arranged next to one another, as can be seen in particular from the sectional views in FIGS. 5 and 6.

Each of the hollow waveguides 10 has slots at the top and bottom, i.e. the antenna structure is radiating on both sides.

The three hollow waveguides are monolithic, i.e. consist of one common part.

The two external hollow waveguides are each provided with a termination structure 20 on their respective lateral outer walls. The termination structures on both sides are arranged mirror-symmetrically relative to the center plane of the antenna structure.

Figure 7:
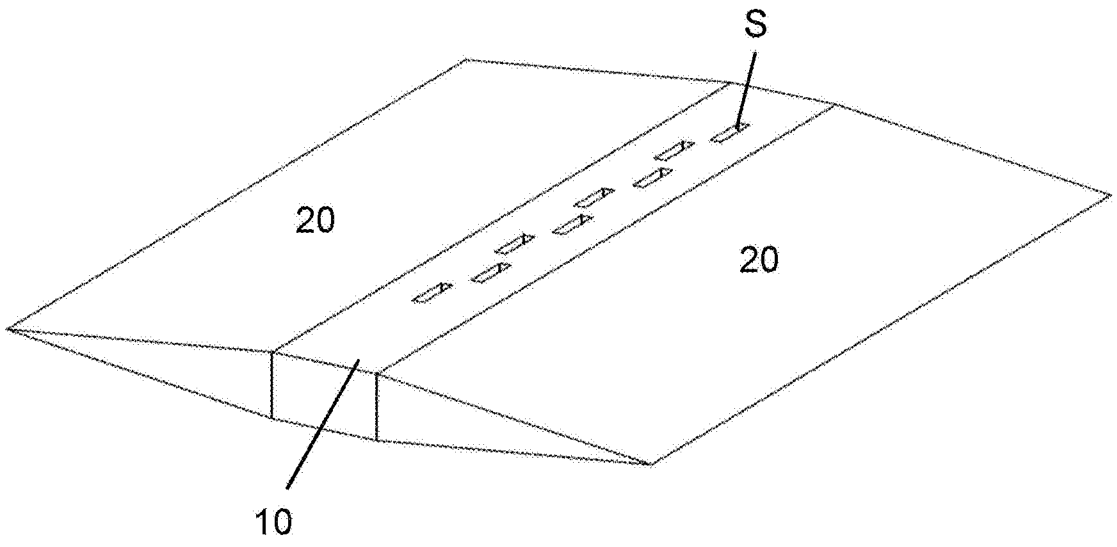
Figure 8:
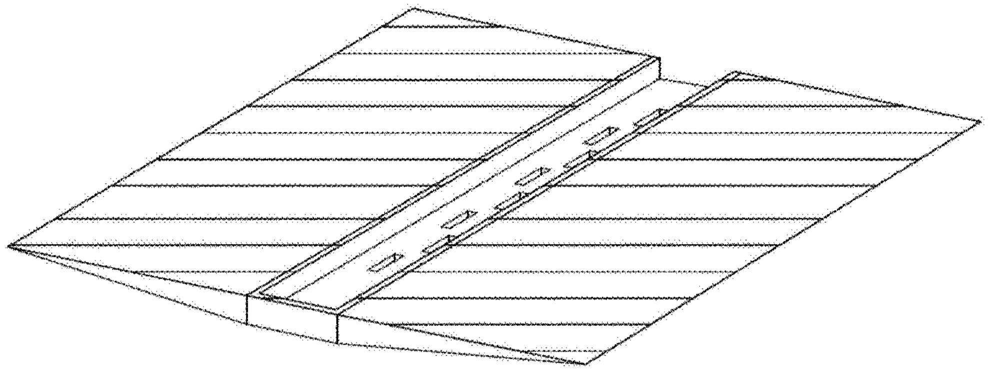
FIG. 8: shows a cross-sectional view of the arrangement according to FIG. 7, FIG. 9: shows a perspective view of a hollow waveguide slot antenna structure having three individual hollow waveguides arranged next to each other with a termination structure on both sides with perforations in the termination structure.

FIGS. 7 and 8 show a perspective and sectional view of an exemplary embodiment as shown in FIG. 1, with the difference that both side walls of the waveguide slot antenna structure are each adjoined by a termination element 20. The tips of the termination elements point in different, opposite directions.

Figure 9:
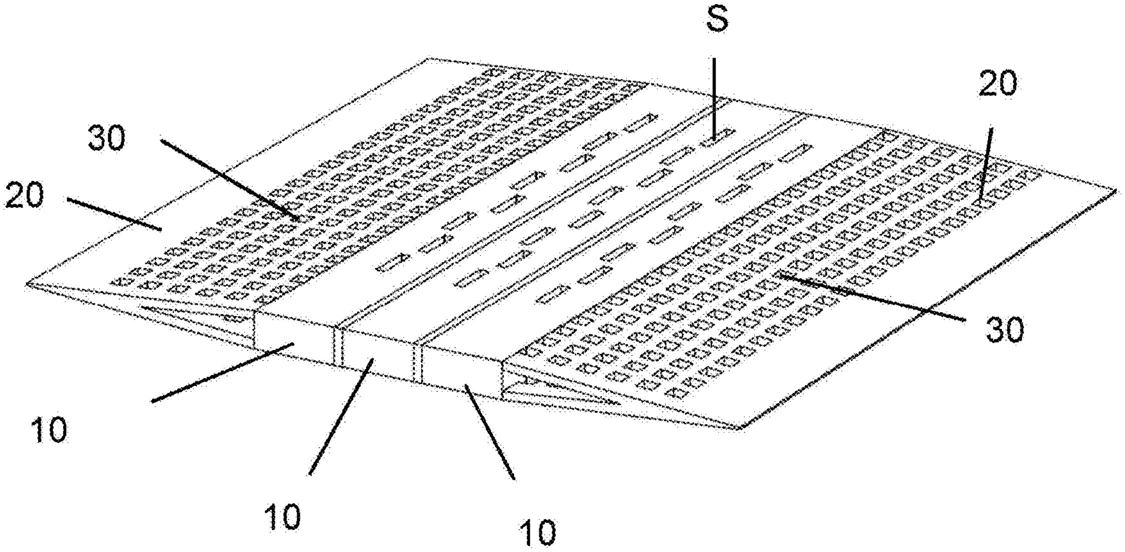
Figure 10:
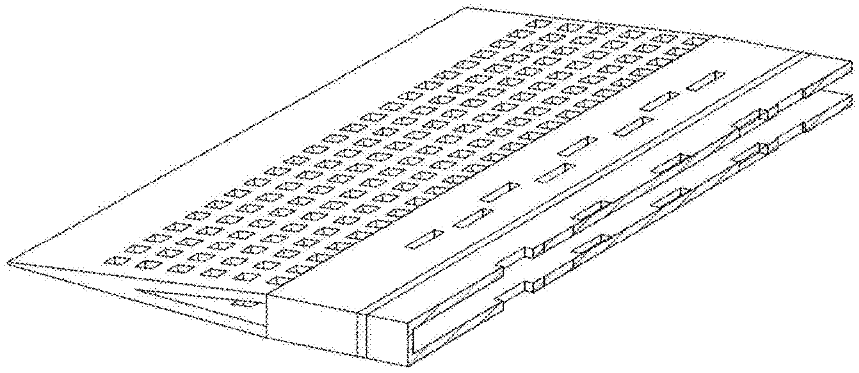
FIG. 10: shows a longitudinal sectional view of the arrangement according to FIG. 9, FIG. 11: shows a cross-sectional view of the arrangement according to FIG. 9, FIG. 12: shows a schematic view of the radiating or receiving area of an antenna structure according to the invention in a hollow waveguide with a termination structure.
Figure 11:
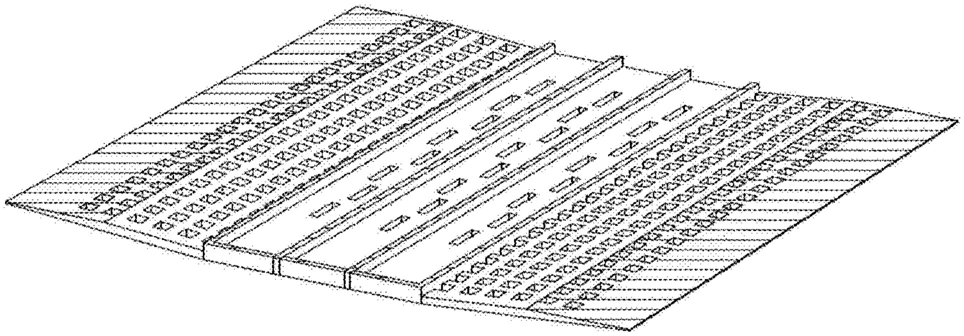

FIGS. 9 to 11 show another embodiment with three hollow waveguides 10 arranged next to each other and consisting of individual elements. They are still monolithic, but hollow and with perforations.

In contrast to the above exemplary embodiments, in the embodiment shown in FIGS. 9 to 11 the termination structures 20 have a cavity and perforations 30. These perforations are preferably non-radiating perforations.

These are located at the top and bottom in the walls of the end element in the area of the cavity.

In addition, perforations are also provided in the termination element in the area where there is no cavity.

Figure 12:
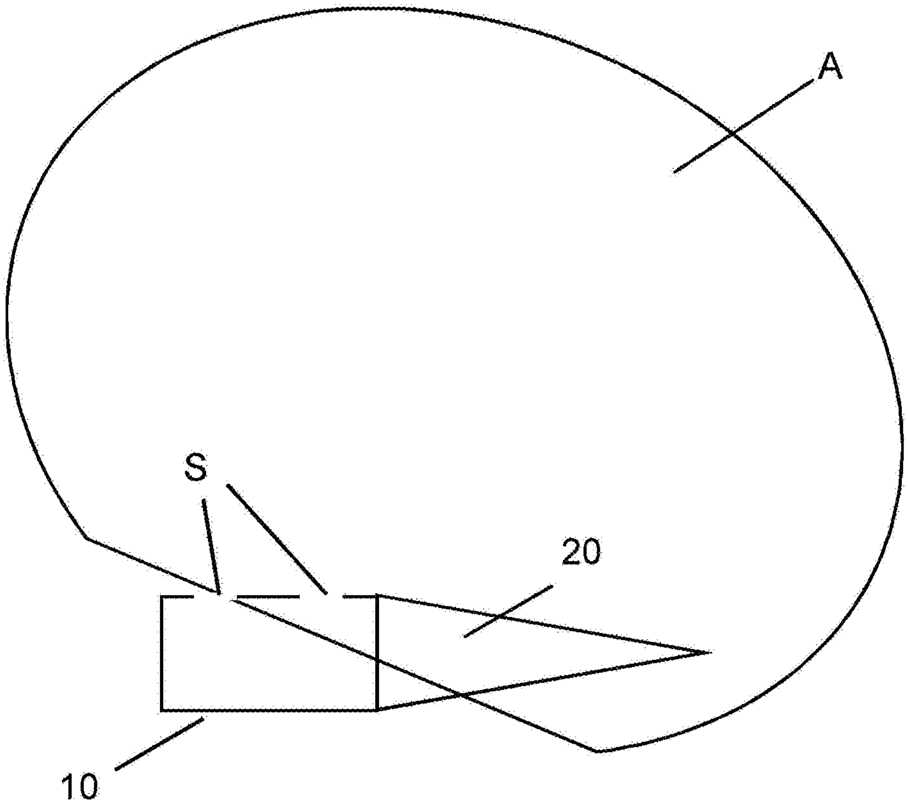

FIG. 12 shows the radiation area A of a hollow waveguide slot antenna structure according to the invention comprising a slotted (slots S) hollow waveguide 10 and the termination structure 20.

Figure 14:
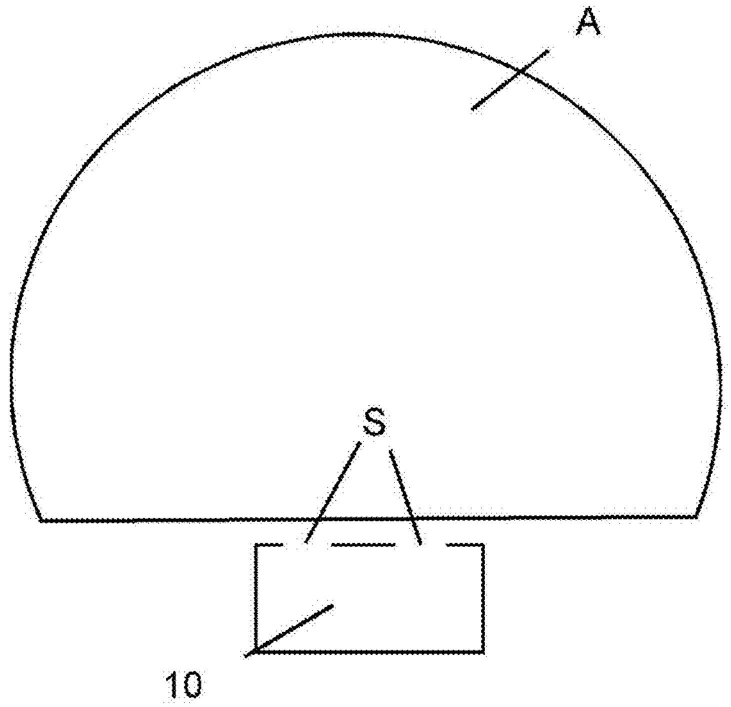
FIG. 14: shows a schematic view of the radiating or receiving area of a hollow waveguide slot antenna structure with a hollow waveguide without a termination structure.

In comparison, FIG. 14 shows the radiation area A of a hollow waveguide slot antenna structure not according to the invention comprising the same hollow waveguide 10 as in FIG. 12, but without a termination structure. It can be clearly seen from the comparison of the figures that the radiation area of the antenna structure is significantly enlarged under identical operating conditions simply by the presence of the termination structure 20 and, in particular, also comprises an area next to the hollow waveguide 10.

Figure 13:
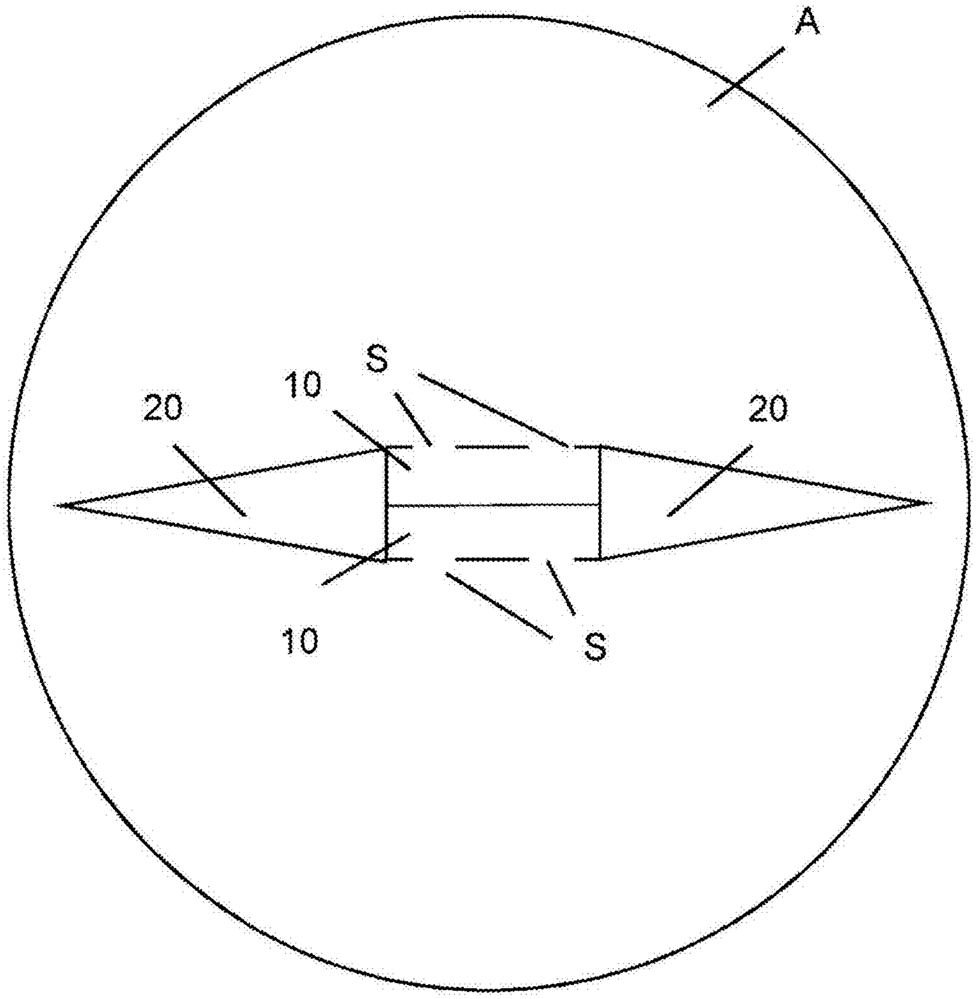
FIG. 13: shows a schematic view of the radiating or receiving area of an antenna structure of a hollow waveguide slot antenna structure according to the invention with two hollow waveguides arranged back-to-back, each with a termination structure.

FIG. 13 illustrates that a very uniform "all-round" radiation area A is produced in the exemplary embodiment in which two hollow waveguides 10, each provided with slots S on their free outer sides, are arranged back-to-back, wherein the hollow waveguide is provided with a termination element 20 on its free side. Each of the termination elements 20 has a height that corresponds to the height of the two hollow waveguides arranged one above the other.

In principle, a single hollow waveguide radiating at the top and bottom can also be used to achieve this result, which is provided with a termination element 20 on both sides.

Preferred, non-limiting embodiments of the invention are described below.

A type of "surface termination structure" is used, which is primarily angular in cross-section and terminating the non-radiating waveguide side.

Other cross-sections of the termination structure are also conceivable, e.g. round or polygonal.

The termination structure can be serrated or corrugated in its longitudinal orientation along the edge, or it can also be straight.

A particularly flat hollow waveguide is advantageous, preferably with a height smaller than half the width, e.g. width: 3 to 4 mm & height 1 mm at 60-90 GHz.

Preferably, the hollow waveguide is slotted on both sides (on one side group). Side group is either both wide sides or both narrow sides A hollow waveguide is provided with radiating slots on at least one side, at least one non-radiating side of which is terminated with a "surface termination structure", primarily with a triangular cross-section.

The cross-sectional shape of the hollow waveguide can be rectangular but can also be round or generally elliptical or otherwise.

It is conceivable that several such antennas could be integrated into a structure with a common surface.

An array of such antennas is preferable. Such an array can be used, for example, for MIMO systems (multiple-input multiple-output=MIMO) (this is a system concept from radar technology).

Pairs of hollow waveguides slotted on one side (very narrow or not very high) and with their backs against each other and fed via a power splitter are also conceivable, wherein the advantage is that there are different radiation characteristics at the front and rear or on both sides.

The waveguide arrangement can be flat, but can also conform to curved surface shapes.

Instead of air, the hollow waveguide can also be filled dielectrically, e.g. with ceramic.

Instead of a conductive hollow waveguide with slots for radiation, a dielectric waveguide with conductive strips is also conceivable (dielectric antenna: conductor and non-conductor are interchanged here).

The slotted hollow waveguide can have a base body with non-radiating slots for galvanic processing. In this case, additional slots or the like are provided to allow the material coating the inside of the base body to be introduced particularly well into the inside of the waveguide base body.

The hollow waveguide can be manufactured as a 3D printed component (metal &/or plastic) with subsequent coating.

The hollow waveguide can be monolithic or made of several parts (i.e. also conventionally manufactured) or manufactured as an injection molded part or conventionally.

An advantageous field of application of the waveguide arrangement according to the invention is the "all-round view", i.e. the 360° detection of waves from the environment or radiation of waves into the environment.

The invention claimed is:

1. Antenna structure, comprising a waveguide, wherein the waveguide comprises a guide element for guiding waves, wherein a termination structure protruding away from the guide element is provided adjacent to the latter, wherein the guide element is a hollow waveguide which comprises a guide channel, the inner surfaces of which are electrically conductive at least in some areas, wherein the guide channel comprises a first wall which comprises one or more radiating perforations, and wherein the guide channel comprises a second wall, wherein the second wall is a non-radiating side of the hollow waveguide and wherein the termination structure extends from the second wall.

2. Antenna structure according to claim 1, wherein the guide element is a dielectric waveguide.

3. Antenna structure according to claim 1, wherein the guide channel comprises one or more walls and in that the perforations are provided in one, several or all walls.

4. Antenna structure according to claim 1, wherein the guide element has a longitudinal axis and in that the termination structure extends in the direction of the longitudinal axis.

5. Antenna structure according to claim 1, wherein the termination structure has a different cross-sectional shape than the guide element and/or in that the termination structure is configured as a compact or hollow body.

6. Antenna structure according to claim 1, wherein the termination structure is polygonal and/or in that the guide element is closed at one end.

7. Antenna structure according to claim 1, wherein the guide channel comprises a third wall which has no perforations, one perforation or several perforations.

8. Antenna structure according to claim 1, wherein the guide channel comprises a fourth wall which comprises a further termination structure.

9. Antenna structure according to claim 8, wherein the fourth wall is a non-radiating side of the hollow waveguide.

10. Antenna structure according to claim 1, wherein the termination structure is located in at least one area where the guide element has radiating perforations in the wall thereof.

11. Antenna structure according to claim 1, wherein the termination structure extends over more than half the length of the guide element.

12. Antenna structure according to claim 1, wherein the termination structure has a side that lies against one side of the guide element.

13. Antenna structure according to claim 1, wherein the termination structure has a side facing away from the side of the guide element from which the termination structure extends.

14. Antenna structure according to claim 13, wherein the side is straight or corrugated or comprises one or more indentations.

15. Antenna structure according to claim 1, wherein the antenna structure comprises exactly one waveguide or guide element or several waveguides or guide elements and/or antenna structures arranged next to and/or on top of each other.

16. Antenna structure according to claim 1, wherein the guide channel is filled with air or with a dielectric.

17. Antenna structure according to claim 1, wherein the waveguide is a hollow waveguide or an antenna or a filter or a resonator or a coupler or any other high-frequency component.

18. Antenna structure according to claim 1, wherein the antenna structure is flat or conforms to a curved surface shape.

19. Antenna structure according to claim 1, wherein the antenna structure comprises slots or other perforations as radiating elements on one or two or more than two sides.

20. Antenna structure according to claim 1, wherein the cross-section of the guide element is such that its height is less than half its width.

21. Antenna structure according to claim 1, wherein the cross-section of the guide element is rectangular, polygonal, round, rounded or elliptical.

22. Antenna structure according to claim 1, wherein the antenna structure comprises one or more pairs of hollow waveguides slotted on one side, with their backs against each other, as well as a power divider for feeding the hollow waveguides.

23. Method for producing an antenna structure according to claim 1, wherein the guide element is manufactured partially or completely by means of additive methods.

24. Method according to claim 23, wherein the waveguide structure is manufactured monolithically or from several parts.

25. Method according to claim 23, wherein the method comprises immersing the guide element one or more times in an immersion bath containing a dispersion, wherein the dispersion has metal-containing particles.

26. Method according to claim 23, wherein the method comprises the step of galvanic or electroless coating of the guide element.

27. Method according to claim 23, wherein one or more slots or other perforations penetrating the walls of the base body are made in the walls of the base body forming the inner surfaces of the base body prior to coating in order to promote the circulation of the dispersion in the cavity or in the area of the inner surfaces.

* * * * *